United States Patent [19]

Ziegler

[11] 4,390,336

[45] Jun. 28, 1983

[54] APPARATUS FOR AIR LAID FIBERGLASS MAT

[75] Inventor: B. Randall Ziegler, Freehold, N.J.

[73] Assignee: GAF Corporation, New York, N.Y.

[21] Appl. No.: 351,795

[22] Filed: Feb. 24, 1982

Related U.S. Application Data

[63] Continuation-in-part of Ser. No. 121,941, Feb. 15, 1980, abandoned.

[51] Int. Cl.$^3$ .............................................. B29C 13/00
[52] U.S. Cl. ................................ 425/82.1; 425/83.1; 425/297
[58] Field of Search ...................... 425/82.1, 83.1, 297

[56] References Cited

U.S. PATENT DOCUMENTS

| | | | |
|---|---|---|---|
| 3,403,425 | 10/1968 | Tajima et al. | 425/82.1 |
| 3,543,351 | 12/1970 | George | 425/82.1 |
| 3,918,126 | 11/1975 | Wood | 425/82.1 |
| 4,123,211 | 10/1978 | Rudloff | 425/82.1 |

Primary Examiner—James R. Hall
Attorney, Agent, or Firm—J. Magee, Jr.; J. G. Mohr

[57] ABSTRACT

An improvement in the apparatus for the production of air laid fiberglass mat is provided. Fiberglass strands from bobbins, rovings or other sources are fed into a chopper assembly for chopping into smaller in length strands. The smaller in length strands then drop by gravity from the chopper assembly and are picked up by an air stream created by a fan or blower located below the chopper assembly. This air stream directs these smaller in length strands into the inlet of the fan or blower. In an alternative, already chopped strands could be fed directly into the inlet of the fan or blower eliminating the need for the chopper assembly. Fan or blower blades then work on these smaller in length fiberglass strands as they pass from the inlet to the exit of the fan or blower to open or fluff said smaller in length fiberglass strands into partially opened strands. The partially opened strands are then directed by the air stream caused by the air stream caused by the fan or blower through an expanding duct. After the partially opened exit the expanding duct the air stream causes the partially opened strands to be deposited onto a moving foraminous conveyor to form an air laid glass mat of uniform thickness. Since the air stream created by the fan or blower is allowed to continue through the foraminous conveyor and there is a vacuum applied from behind the foraminous conveyor, and opposite the outlet of the expanding duct, a uniform deposit of partially opened fiberglass strands onto the conveyor is assured.

3 Claims, 1 Drawing Figure

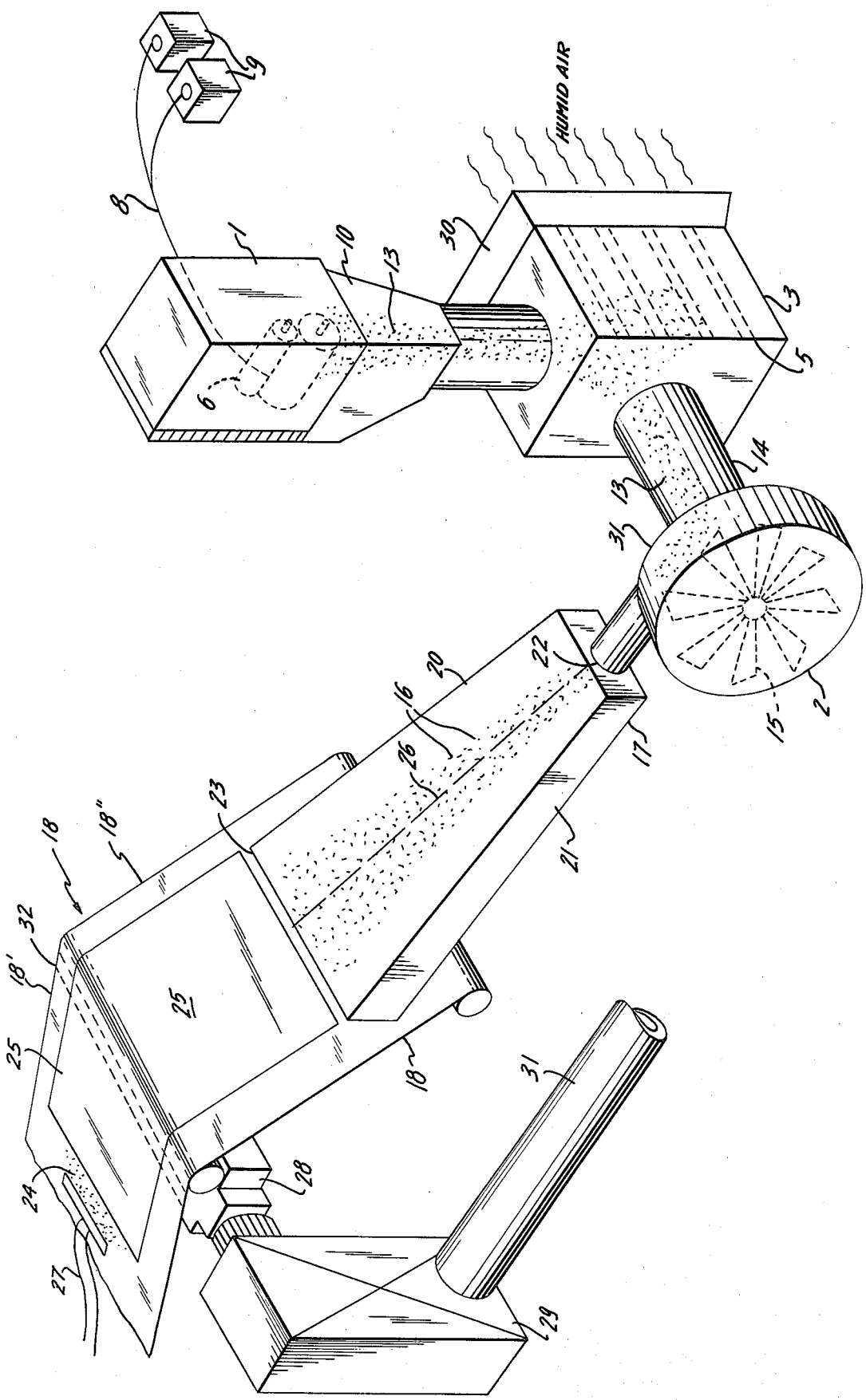

APPARATUS FOR AIR LAID FIBERGLASS MAT

BACKGROUND OF THE INVENTION

This application is a continuation in part of my application Ser. No. 121,941, filed Feb. 15, 1980, now abandoned.

Apparatus for the production of air laid glass mat have been plagued by the difficult problem of obtaining a mat having even distribution. In the prior art apparatus for the production of air laid glass mat a plurality of glass strands were received by a chopper assembly and after being chopped were acted upon by direct air flow to direct the chopped glass strands through a hood and onto a nonporous moving conveyor where the strands were continuously collected in the form of a mat.

One difficulty with the above apparatus was that the circulation of air flow within the distribution duct was difficult to control. Air flow was generally turbulent away from the side of the duct and laminier to quiescent near the side walls of the duct. One attempted solution to this problem was to have more than one air inlet port to direct strands into desired patterns, however, this proved unsuccessful. Another problem with the prior art apparatus was the bouncing off of the strands from the conveyor where the mat was being formed due to pressure differentials at and immediately above the conveyor. These pressure differentials caused the strands to move or jump after being deposited onto the conveyor towards the low pressure areas of the conveyor which are generally adjacent to the edges of the conveyor. Therefore, even if one initially solved the distribution problem they were still faced with the problem of the strands moving after being deposited on the conveyor.

A still further problem of the prior art was that the chopped fiberglass strands acquired a static charge after leaving the chopper assembly and had a tendency to bunch-up in wads or balls after discharge from said assembly. This contributed to the problem of non-uniform distribution of the strands both prior to as well as subsequent to their deposit onto the conveyor surface. Additionally this caused clogging or plugging of the apparatus. Heretofore, this problem was largely overcome by the employment of commercially available static electricity bars located below the chopper assembly. But locating the static bars below the chopper assembly created a hazard in which the electrical arcing of the bars would adversely react with the fumes from resins normally employed in glass mat formation. Further the glass strands tended to hang up on the static bars requiring periodic difficult and time consuming cleaning. A suggested solution to this problem was to add moisture to the fibers to reduce their static charge however, this was not completely successful. It has, however, now been found that by having an atmosphere of approximately 70% relative humidity, water to air, adjacent to where the chopper assembly is located greatly reduces the static electric problem.

SUMMARY OF THE INVENTION

The apparatus of this invention solves the problems of the prior art by providing a uniform flow of partially opened chopped glass strands to a foraminous conveyor for the production of a uniform glass mat. This is accomplished by allowing the glass strands, after they are chopped, to be fed into the inlet of a fan or blower where the chopped strands are partially opened strands by the interaction of the strands with the blades and housing of the fan or blower. These partially opened strands are then directed as they exit the fan or blower by the same air stream of the fan or blower that brought said strands into the fan or blower, through an expanding duct to a foraminous conveyor where the fiberglass mat is formed.

Uniform partially opened glass strand flow is maintained in the present apparatus, because the chopped glass strands, unlike the prior art, are maintained in the same air stream after it passes through the fan exit, as they were prior to the fan inlet. Since the strands are maintained in the same air stream and are opened as they pass through the fan or blower, a uniform distribution and adherence between the partially opened strands is assured as they pass through the duct and form on the conveyor. Uniform distribution is assured even if the air flow stream is turbulent, since the directional flow is unvaried both before and after entry into the fan or blower. Finally, since the conveyor belt is foraminous with a uniform vacuum working from behind the conveyor there is no differential pressures on the surface of the conveyor to promote uneven distribution of the partially opened strands forming on the conveyor surface.

In accordance with the present invention it has been found that by having air ionizers, or an approximately 70% relative humidity prior to the air intake of the fan or blower assembly the static electricity charge problem is solved without the danger or maintenance problems of the prior art.

It is, therefore, the principal object of this invention to provide an improved device for the production of air laid glass mat.

A further object of the invention is to provide an improved air flow device for the distribution of chopped strands as said strands travel from a chopper assembly to a point where they form a glass mat.

Yet another object of the invention is to provide an apparatus for producing glass mat that operates in an atmosphere of approximately 70% relative humidity.

Many other objects and advantages of the invention will be apparent from the following detailed description of the preferred embodiment as read in conjunction with the accompanying drawing.

DESCRIPTION OF THE DRAWING

FIG. 1 is a perspective view of the apparatus.

PREFERRED EMBODIMENT OF THE INVENTION

Referring to the drawing, an apparatus for producing air laid fiberglass mat includes a chopper assembly 1, a fan or blower 2, a distribution duct 3, and a foraminous conveyor 18. The chopper assembly 1 can be of several designs heretofore known for chopping glass strand. Humid air is induced by an air moisturizer, 30, of any known type, located adjacent to the distribution duct 3 to avoid static charge on strands 13. To further reduce this charge one may also use air ionizers 5, of known design, which are located adjacent to where the chopped glass strands fall from the chopper assembly 1 and out of the line of flow of the falling chopped strands 13. The assembly 1 includes a cutter wheel 6 as well as all the other standard features of a chopper assembly 1, such as a back-up roller 7 for the chopping of glass strands 8 supplied from bobbins or roving packages 9 into shorter length strands 13. If, however, one wishes to use already chopped strands 13, the chopper assembly 1 may be eliminated and chopped strands 13 may be fed directly into upper distribution chute 10. In either circumstances humid air alone or in conjunction with air ionizers 5 are still used to prevent static electrically charged build up on the strands. As shown, the strands 8 are fed to a point near the engagement of the backup roll 7 and cutter wheel 6 from the bobbing or roving package 9.

The chopped strands 13 produced at the chopper assembly 1, are then fed into upper distribution chute 10 and are caused to move downwardly by gravity into an air stream caused by the fan or blower 2 said air stream pulling said strands 13 into the inlet 14 of the fan or blower 2. The chopped strands 13, after entering inlet 14 of fan or blower 2, are worked on by the multiple blades 15 of the fan or blower 2 as well as the fan or blower housing 31 to open up or fluff said strands 13, i.e. the chopped strands 13 are opened partially or totally into partially opened strands 16.

The partially opened strands 16 are then conveyed through an expanding duct 17 by the same direct air stream of the fan or blower 2 which caused the chopped strands 13 to be pulled into the inlet 14 of the fan or blower 2. After the strands 13 have passed through the fan or blower 2 and are formed into partially opened strands 16 they are directed through the expanding duct 17 onto the lower near vertical portion 18" of a foraminous conveyor 18 for forming into a mat 25. Since the speed of fan or blower 2 can be varied the need for a valve to control the air flow is eliminated making the assembly simple.

The expanding duct 17 consists of side walls 19 usually 7 inches in width near the fan exit 22 to about 2 inches in width near its exit end 23. The top 20 and bottom 21 walls have a taper from about 7½ inches at the exit 22 of the fan or blower 2 to about 48 inches at the exit opening 23 adjacent the foraminous conveyor 18. The height of exit 22 being usually 2 inches high near foraminous conveyor 18. While the dimensions are not critical, it is important that the angle formed by the centerline 26 of the exit and entrance openings of the expansion duct 17 and the side of the duct 17 be between 1°-18° with 4°-6° being preferred to maintain a uniform turbulent air stream. This uniform stream is necessary to insure a uniform deposit of the partially opened strands 16 onto the foraminous conveyor 18. It being understood that the center line being talked about is the line located between the center of inlet 22 and the center of exit 23 along the top wall 20. From the exit 23 the partially opened strands 16 are ejected by the uniform air stream of the fan or blower 2 onto a foraminous conveyor belt or other forming surface of porous design. A resin 24, if required, may be directed onto the surface of the formed glass mat 25 at the upper portion 18' of the foraminous conveyor 18 by suitable means such as spray gun 27 as the fiberglass mat 25 moves along the upper portion 18' of the foraminous conveyor 18. By applying the resin 24 at this point the apparatus can be easily kept clean without maintenance problems.

The velocity of the air stream from the fan or blower 2 assembly is easily controlled by alternating the speed of the fan or blower 2 to ensure that the velocity is sufficient to overcome the adhesive force exerted on the partially opened strands 16 as they travel down the duct 17. The tapering of the expansion duct 17 which as before stated is between 1 and 18 degrees with the preferred taper being between 4 and 6 degrees helps to maintain uniform velocity of the air and keeps the partially opened strands 16 apart and in suspension in the air to ensure uniform distribution on the foraminous conveyor belt 18.

While it will be readily understood that the stream of air in the expansion duct 17 will depend on the particular installation, such duct 17 should be constructed in order that the dimensions of the duct 17 are such that a minimum velocity is maintained in the duct 17 to keep the partially opened strands 16 uniformly dispersed which in turn will assure that said partially opened strands 16 will be deposited on conveyor 18 after they exit the duct 17. It has been found that having the expansion duct 17 of approximately rectangular shape at its inlet 22, i.e. 7 inches high 7½ wide with said duct 17 having an overall length of 16 feet and an exit end 23 having a height of 2 inches and a width of 48 inches, satisfactory operation of the apparatus will be achieved. Satisfactory result were however, obtained with the use of ionized air or approximately 70% relative humidity.

The air velocities at the exit of duct 17 of approximately 4400 FPM assures smooth conveyance of the partially opened strands 16 into duct 17, without creating the problem of blowing the forming glass mat 25 off of the foraminous conveyor belt 18. However, by the conveyor belt 18 being foraminous and a vacuum being applied through the conveyor belt 18 by way of suction slot 32 located opposite the exit 23 of the duct 17 and the mat forming surface of the conveyor 18, and hood 28 connecting a suction source, not shown, by way of suction chamber 29 and suction pipe 31 to slot 32, the bunching or distribution problem is readily reduced or solved, as is the problem of the partially opened strands 16, bouncing once they hit the conveyor 18 since the vacuum holds them in place.

The uniform mat 25 that is formed by the present apparatus is easily handled, since partially opened strands 16 due to their fluffed structure readily tangle when forming on the conveyor 18 causing them to adhere extremely well.

I claim:

1. An apparatus for forming a fiberglass mat comprising,
   means for directing chopped fiberglass strands in a moisturized air inducing means and then into the inlet and out of the exit of a blower means,
   means within the blower means to partially open the chopped fiberglass strands into fiberglass partially opened strands, as well as means to direct the partially opened strands into a duct means,
   the duct means being constructed to maintain a minimum uniform air velocity within the duct means for a given blower means exit velocity,
   a foraminous conveyor means adjacent the duct means for the deposit of the partially opened strands in the form of a glass mat, and
   means located adjacent to the foraminous conveyor means to exert a vacuum force through the conveyor to hold the partially opened strands of the glass mat on the conveyor.

2. The apparatus of claim 1 wherein the air velocity exiting the blower means is less then 4400 fpm and the duct means has a taper from its blower side to its conveyor side of 1 to 18 degrees measured from a center line drawn from a center position of its inlet to a center position on its exit side.

3. The apparatus of claim 1 wherein the moisturized air inducing means provides a relative humidity of approximately 70%.

* * * * *